(12) United States Patent
Wang et al.

(10) Patent No.: US 6,991,213 B2
(45) Date of Patent: Jan. 31, 2006

(54) DUAL DIAPHRAGM VALVE

(75) Inventors: Tzu-Yu Wang, Maple Grove, MN (US); Eugen I Cabuz, Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/915,868

(22) Filed: Aug. 9, 2004

(65) Prior Publication Data

US 2005/0139797 A1 Jun. 30, 2005

Related U.S. Application Data

(63) Continuation-in-part of application No. 10/748,817, filed on Dec. 30, 2003, now Pat. No. 6,886,410.

(51) Int. Cl.
*F16K 31/02* (2006.01)

(52) U.S. Cl. .............................. 251/129.01; 417/413.1; 417/480

(58) Field of Classification Search ........... 251/129.01, 251/129.02; 417/480, 413.1, 413.2
See application file for complete search history.

(56) References Cited

U.S. PATENT DOCUMENTS

| | | | | |
|---|---|---|---|---|
| 5,325,880 A | * | 7/1994 | Johnson et al. | 251/129.01 |
| 5,452,878 A | * | 9/1995 | Gravesen et al. | 251/129.01 |
| 5,671,905 A | * | 9/1997 | Hopkins, Jr. | 251/129.01 |
| 5,941,501 A | * | 8/1999 | Biegelsen et al. | 251/129.01 |
| 5,971,355 A | * | 10/1999 | Biegelsen et al. | 251/129.01 |
| 6,179,586 B1 | * | 1/2001 | Herb et al. | 417/480 |
| 6,568,286 B1 | * | 5/2003 | Cabuz | 73/863.33 |
| 6,729,856 B2 | * | 5/2004 | Cabuz et al. | 417/413.1 |
| 6,767,190 B2 | * | 7/2004 | Cabuz et al. | 417/413.1 |

* cited by examiner

*Primary Examiner*—John Bastianelli
(74) *Attorney, Agent, or Firm*—Kris T. Fredrick

(57) ABSTRACT

A valve for regulating the flow of fluids (gas or liquid) using two flexible diaphragms in which an additional element is added to promote rolling contact between the diaphragms. The valve operates in a normally open configuration where fluid flows into the valve, passed through holes or openings in two electrostatically operative diaphragms and out of the valve. The holes or openings in one diaphragm are offset from the holes or openings in the other diaphragm, so that upon electro-static actuation, the diaphragms will seal together, closing the valve.

14 Claims, 1 Drawing Sheet

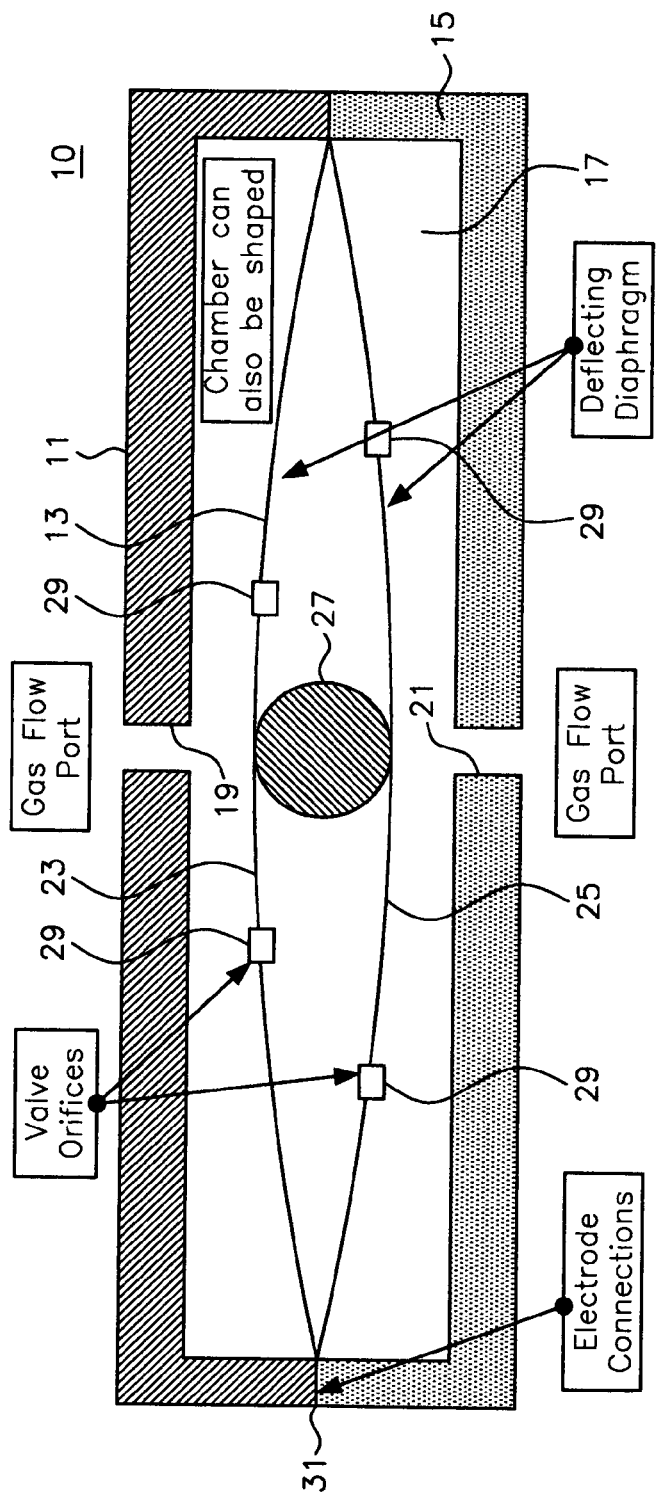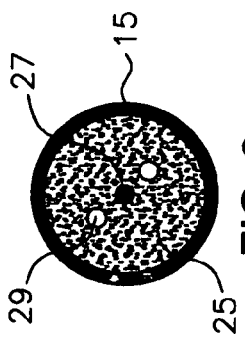

DUAL DIAPHRAGM VALVE

This is a continuation-in-part of a prior application filed on Dec. 30, 2003, now U.S. Pat. No. 6,886,410 having Ser. No. 10/748,817, which is incorporated herein by reference in its entirety.

FIELD OF THE INVENTION

The present invention relates in general to pressure sensor technology and, more particularly, to low cost valves for either disposable or high volume applications of pressure sensors for gas and liquid based flow regulation.

BACKGROUND OF THE INVENTION

Modern industrial, commercial, aerospace and military systems depend critically on reliable pumps for fluid handling. Both gas and liquid fluids take advantage of smaller, more distributed and more portable systems for increasing uses in instrumentation and control.

Although important advances in pump technology have been made in the past few decades, progress has been slowed down considerably in the ability to reduce pump size, weight, power consumption and cost. There remains a large gap between the technology for conventional pumps, including micropumps, and more advanced pumps based on microelectronics technology.

The pumping range of micropumps is from about one to tens of microliters per minute. Thus they are useful for applications such as implantable systems for drug delivery or micro dosage for chemical analysis systems. However, pump speeds are still too slow for use in sampling applications. Pressure sensing can at times require rapid reports of any change in pressure, particularly to anticipate a major change in pressure before it fully takes place.

An improved electrostatic pump has been developed, as described in U.S. Pat. No. 6,179,586. In this patent, the pump consists of a single molded plastic chamber with two thin diaphragms staked directly on top of each other. The diaphragms are actuated, depending on design, with electrostatic, electromagnetic or piezoelectric methods. This patent describes the use of a single chamber for pumping.

It is also desirable, if possible, to use technology of this type for valves that regulate flow from various pumps and fluid flow systems. Valves can be used to control the flow or absence of flow from electrostatic pumps.

It would be of great advantage if a valve using conventional mesopump construction could be provided.

Another advantage would be if a valve using conventional mesopump construction could be made from inexpensive parts.

Yet another advantage would be if a value could be designed that would operate as a safety valve or a check valve.

Other advantages and features will appear hereinafter.

SUMMARY OF THE INVENTION

The present invention provides improvements in low cost, effective meso-pressure valves, It is made from inexpensive, injection molded plastics and plastic films that are readily available from many commercial sources.

The valves include a first chamber defining part, a first flexible diaphragm mounted on one side in communication with the first chamber and a second flexible diaphragm separated from the first diaphragm by an insulator. A second chamber defining part is mounted on the other side of the second diaphragm. Flow from one chamber to the other, and thus through the valve, through holes in the two diaphragms. These holes are aligned to be offset from each other, such that on electro-static actuation, the diaphragms will seal together, closing openings in both diaphragms, thus closing the valve and stopping flow of fluid.

If the delta pressure, or pressure in minus pressure out, is greater than a certain value, by selecting the appropriate hole size and location, the valve may seal when the two diaphragms come in contact with a certain force, even without electro-static actuation. Thus it functions as a check valve.

BRIEF DESCRIPTION OF THE DRAWINGS

For a more complete understanding of the invention, reference is hereby made to the drawings, in which:

FIG. 1 is a side elevational view, in section, of a valve according to the present invention; and FIG. 2 is a plan view of the embodiment shown in FIG. 1.

In the figures, like reference characters designate identical or corresponding components and units throughout the several views.

DETAILED DESCRIPTION OF THE PREFERRED EMBODIMENT

The valves of this invention have elements disclosed in a prior, commonly owned application by the same inventors and filed on Dec. 30, 2003, having Ser. No. 10/748,817, which has been incorporated herein above by reference in its entirety.

Referring to the figures, FIG. 1 illustrates a valve 10 generally that has an upper chamber forming element 11 defining chamber 13 and a lower chamber forming element 15, to define a second chamber 17. Chamber 13 has valve port 19 and chamber 17 has valve port 21. The chamber defining elements 11 and 15 may be made from plastic or other nonconductive materials and may be molded or fabricated. Neither part 11 or 15 has any metallization or other patterning.

An upper diaphragm 23 is mounted on the upper chamber forming element 11. Diaphragm 23 may be a plastic film with metallization or a dielectric film. A lower diaphragm 25 is mounted on the lower chamber forming element 15. Diaphragm 25 may also be a plastic film, either with metallization or formed from dielectric film. Spacer 27 is also preferably made from plastic and contains no metallization. Spacer 27 may be round or spherical, as shown, or it may have any other shape, such as cubical or egg-shaped, for example. Spacer 27 separates diaphragms 23 and 25. Both diaphragms 23 and 25 have at least one opening or hole 29, and preferably have at least two holes 29. Holes 29 in one diaphragm 23 are positioned to be offset from the holes in the other diaphragm 25, so that electro-static actuation will cause the diaphragms to make contact and seal the holes 29. In a preferred embodiment, holes 29 in one diaphragm, such as diaphragm 23, are radially inward of holes 29 in the other diaphragm, such as in diaphragm 25. This embodiment allows the valve to reduce flow without halting flow of the fluid completely. Electrode connection is made at contact 31, as shown in FIG. 1.

FIG. 2 is a plan view of the valve of FIG. 1. Lower chamber forming element 15 includes spacer 27 and lower diaphragm 25, with holes 29.

Holes 29 in films 23 and 25 are shown in FIG. 2 as being equally spaced from the center of the films. In FIG. 1, holes 29 in film 23 are closer to the center than holes 29 in film 25. This is only shown to illustrate the existence of the holes 29. Holes 29 can be place anywhere on films 23 and 25, such as, for example, closer to the periphery of the films 23 and 25, or in a pattern where some or all holes are in a different orientation with respect to rest of the holes. The placement of holes on film 23 does not have to be the same as on film 25. The number of holes may be as few as one and as many as desired. Any pattern may be used. The function of the holes is to permit pressure changes to be communicated to the device to permit diaphragm 29 to change the capacitive relationship with either film 23 or 25, or both. In a preferred embodiment, the holes 29 in film 25 will be closed by the impervious portion of film 23 when the initial rolling contact of the films brings them together at the outer edges of the films. Under increased pressure, or by increased electrostatic actuation, holes 29 in film 23 will also be closed by contact with the impervious portion of film 25.

Film 25 is exposed to the inlet pressure $P_i$ at port 21 and the fluid flows through holes 29 to the area between the films 23 and 25, through the holes 29 in film 29 and out the outlet port 19, with outlet pressure $P_o$. If the delta pressure $P_i$-$P_o$ is greater than a certain value as selected for a particular application, the valve will seal when films 23 and 25 come into mutual contact because of that predetermined force, even when electrostatic actuation is applied.

This functions as a safety valve, but the valve of this invention can also operate as a check valve. Pressure in one direction that exceeds a desired value would cause the valve to close.

The valves of this invention may be used with any fluid, including gases such as the atmosphere, gas pumps, chemical and electrolytic reactions, and the like or including liquids such as reactors, test devices, pumps and the like.

While particular embodiments of the present invention have been illustrated and described, they are merely exemplary and a person skilled in the art may make variations and modifications to the embodiments described herein without departing from the spirit and scope of the present invention. All such equivalent variations and modifications are intended to be included within the scope of this invention, and it is not intended to limit the invention, except as defined by the following claims.

What is claimed is:

1. A valve device for regulating flow of fluids, comprising:
   a first chamber defining part having a first opening for fluid flow;
   a first flexible diaphragm having two sides and mounted on one side in communication with said first chamber defining part, said first flexible diaphragm having a conductive surface and at least one opening in said surface for flow of fluid there through,
   a second chamber defining part having a second opening for fluid flow;
   a second flexible diaphragm having two sides and mounted on one side in communication with second chamber defining part, said second flexible diaphragm having a conductive surface and at least one opening in said surface, said at least one opening in said first diaphragm being offset from said at least one opening in said second diaphragm;
   a spacer element positioned between said first and second diaphragms and aligned to normally separate said first and second diaphragms to permit fluid flow through said at least one opening in both of said first and second diaphragms; and
   electrical connections contacting said first and said second flexible diaphragms and adapted to vary the capacitance between said diaphragms to cause said one flexible diaphragms to move with respect to said other of said flexible diaphragms such that said at least one hole in each diaphragms is sealed by contact with the closed surface of the other of said diaphragms.

2. The device of claim 1, wherein said first and second diaphragms each have at least two holes.

3. The device of claim 2, wherein said at least two holes in one of said first and second diaphragms are located at different portions of the one diaphragm than the at least two holes in the other of said first and second diaphragms.

4. The device of claim 1, wherein said spacer element comprises a non-conductive spherical element positioned between said first and second diaphragms at said center thereof to separate said diaphragms while permitting rolling of said diaphragms upon electro-static actuation of at least one of said diaphragms.

5. The device of claim 1, wherein said first and second diaphragms are plastic films having a conductive portion on their surfaces.

6. The device of claim 5, wherein said conductive portion is a metalized surface.

7. The device of claim 5, wherein said conductive portion is a dielectric film.

8. A valve device for regulating flow of fluids, comprising:
   first chamber defining part means for having a first opening for fluid flow;
   first flexible diaphragm means for electrostatic movement and having two sides and mounted on one side in communication with said first chamber defining part, said first flexible diaphragm means having a conductive surface and at least one opening in said surface for flow of fluid there through,
   second chamber defining part means for having a second opening for fluid flow;
   second flexible diaphragm means having two sides and mounted on one side in communication with second chamber defining part means, said second flexible diaphragm means having a conductive surface and at least one opening in said surface, said at least one opening in said first diaphragm means being offset from said at least one opening in said second diaphragm means;
   spacer element means for positioning between said first and second diaphragms and aligned to normally separate said first and second diaphragm means to permit fluid flow through said at least one opening in both of said first and second diaphragm means; and
   electrical connections means for contacting said first and said second flexible diaphragms and adapted to vary the capacitance between said diaphragms to cause said one flexible diaphragm means to move with respect to said other of said flexible diaphragm means such that said at least one hole in each diaphragm means are sealed by contact with the closed surface of the other of said diaphragm means.

9. The device of claim 8, wherein said first and second diaphragm means each have at least two holes.

10. The device of claim 9, wherein said at least two holes in one of said first and second diaphragm means are located at different portions of the one diaphragm means than the at least two holes in the other of said first and second diaphragm means.

11. The device of claim 8, wherein said spacer element means comprises a non-conductive spherical element positioned between said first and second diaphragm means at said center thereof to separate said diaphragm means while permitting rolling contact by said diaphragm means upon electrostatic actuation of at least one of said diaphragm means.

12. The device of claim 8, wherein said first and second diaphragm means include plastic films having a conductive portion on their surfaces.

13. The device of claim 12, wherein said conductive portion is a metalized surface.

14. The device of claim 12, wherein said conductive portion is a dielectric film.

* * * * *